(12) United States Patent
Takagi

(10) Patent No.: US 9,020,513 B2
(45) Date of Patent: Apr. 28, 2015

(54) MOBILE COMMUNICATION SYSTEM, RADIO BASE STATION APPARATUS, CELL AREA COOPERATIVE CONTROL METHOD AND PROGRAM

(75) Inventor: Kenki Takagi, Tokyo (JP)

(73) Assignee: NEC Corporation, Tokyo (JP)

( * ) Notice: Subject to any disclaimer, the term of this patent is extended or adjusted under 35 U.S.C. 154(b) by 95 days.

(21) Appl. No.: 13/501,687

(22) PCT Filed: Oct. 13, 2010

(86) PCT No.: PCT/JP2010/067975
§ 371 (c)(1),
(2), (4) Date: Apr. 12, 2012

(87) PCT Pub. No.: WO2011/046150
PCT Pub. Date: Apr. 21, 2011

(65) Prior Publication Data
US 2012/0208543 A1    Aug. 16, 2012

(30) Foreign Application Priority Data
Oct. 15, 2009  (JP) .................................. 2009-238677

(51) Int. Cl.
| H04W 40/00 | (2009.01) |
| H04B 7/02 | (2006.01) |
| H04W 24/02 | (2009.01) |
| H04W 16/08 | (2009.01) |
| H04W 36/22 | (2009.01) |
| H04W 92/20 | (2009.01) |

(52) U.S. Cl.
CPC .............. *H04B 7/024* (2013.01); *H04W 16/08* (2013.01); *H04W 24/02* (2013.01); *H04W 36/22* (2013.01); *H04W 92/20* (2013.01)

(58) Field of Classification Search
CPC ....... H04W 4/06; H04W 16/06; H04W 48/17; H04W 4/12; H04W 4/206; H04W 80/04; H04W 88/005; H04W 88/06
USPC .................. 455/449, 443, 444, 423; 370/216
See application file for complete search history.

(56) References Cited

U.S. PATENT DOCUMENTS

| 7,054,635 | B1 * | 5/2006 | Ritzen et al. .................. 455/444 |
| 7,218,605 | B2 * | 5/2007 | Ochiai et al. .................. 370/216 |
| 2009/0067339 | A1 * | 3/2009 | Byun et al. .................... 370/252 |
| 2010/0167728 | A1 * | 7/2010 | Venkitaraman et al. ...... 455/434 |
| 2011/0045865 | A1 * | 2/2011 | Viering et al. ................. 455/522 |

FOREIGN PATENT DOCUMENTS

| JP | 11-251995 | * | 9/1999 |
| JP | 11-251995 | A | 9/1999 |
| JP | 2002-300635 | A | 10/2002 |

(Continued)

*Primary Examiner* — Christopher M Brandt
*Assistant Examiner* — Joseph Dean, Jr.
(74) *Attorney, Agent, or Firm* — Foley & Lardner LLP

(57) ABSTRACT

A mobile communication system comprises: a first radio base station apparatus transmitting, after recovering from a service halt state and before starting to execute a stepwise cell area expansion, a notification including an instruction for a cell area reduction corresponding to the cell area expansion to a neighboring second radio base station apparatus; and a second radio base station apparatus reducing a cell area that has been expanded during the service halt state of the first radio base station apparatus, in accordance with the instruction for a cell area reduction included in the notification transmitted from the first radio base station apparatus.

11 Claims, 8 Drawing Sheets

(56) References Cited

FOREIGN PATENT DOCUMENTS

| | | | |
|---|---|---|---|
| JP | 2003-78938 A | | 3/2003 |
| JP | 2006-101442 A | | 4/2006 |
| JP | 2007-124300 | * | 5/2007 |
| JP | 2007-124300 A | | 5/2007 |

\* cited by examiner

MOBILE COMMUNICATION SYSTEM, RADIO BASE STATION APPARATUS, CELL AREA COOPERATIVE CONTROL METHOD AND PROGRAM

REFERENCE TO RELATED APPLICATION

This application is the National Phase of PCT/JP2010/067975, Oct. 13, 2010, and claims the benefit of the priority of Japanese patent application No. 2009-238677, filed on Oct. 15, 2009, the disclosures of which are incorporated herein in their entirety by reference thereto.

TECHNICAL FIELD

The present invention relates to a mobile communication system, a radio base station apparatus, a cell area cooperative control method, and a computer program. In particular, it relates to: a mobile communication system including a function of enabling neighboring radio base station apparatuses to complement the coverage area of a halted radio base station apparatus; a radio base station apparatus; a cell area cooperative control method; and a computer program.

BACKGROUND

In a 3.9G mobile communication system referred to as LTE (Long Term Evolution), to reduce maintenance and operation work of telecommunications carriers, introduction of a technique referred to as SON (Self Organizing Network) is being proposed.

If a radio base station apparatus needs to temporarily halt transmission of radio waves because of failures, malfunctions, software updates, or the like, the radio base station apparatus cannot continue to provide services in the coverage area thereof. Based on one function referred to as the SON, for example, neighboring radio base station apparatuses change the antenna tilts and increase the reference signal transmission power, to temporarily expand coverage areas of the neighboring radio base station apparatuses. Namely, a method of temporarily complementing the coverage area of a radio base station apparatus that halts transmission of radio waves is being discussed (see FIG. 7).

For example, a maintenance and monitoring apparatus, which is an upper apparatus of radio base station apparatuses 100 to 102 in FIG. 7, monitors states of these subordinate radio base station apparatuses 100 to 102. For example, if the maintenance apparatus detects a failure in the radio base station apparatus 101, the maintenance apparatus instructs the neighboring radio base station apparatuses to expand the coverage areas thereof, as illustrated in FIG. 7(2). In this way, services in the cell area of the radio base station apparatus 101 can be provided continuously.

Patent Document 1 discloses a mobile communication system in which each radio base station apparatus automatically changes the size of the cell thereof, depending on the traffic amount in the cell. Based on a function of this mobile communication system, if the operation of a cell is halted, neighboring cells cover the area of the halted cell, so that services in the area can be provided continuously.

Patent Document 1:
Japanese Patent Kokai Publication No. JP-P2006-101442A

SUMMARY

The entire disclosure of the above Patent Document 1 is incorporated herein by reference thereto.

The following analyses are given by the present invention.

As described above, while the neighboring radio base station apparatuses are covering the problematic cell area, the halted apparatus is reset or a card (panel) causing a failure is replaced, for example. As a result, the halted radio base station apparatus recovers from the failure. However, the following problems may arise, depending on the timings at which the radio base station apparatuses reduce the expanded coverage areas thereof.

1. Before the radio base station apparatus having the failure is prepared to operate, if the neighboring radio base station apparatuses reduce the expanded coverage areas thereof, namely, if the coverage areas return from the state in FIG. 7(2) to the state in FIG. 7(1), not only temporarily uncovered areas may be caused but also disconnection may be caused in mobile station terminals during communication.

2. Even after the radio base station apparatus having the failure recovers and starts transmission, if the neighboring radio base station apparatuses maintain the expanded coverage areas, namely, if the coverage areas change from the state in FIG. 8(1) to the state in FIG. 8(4), interference in the recovered area is increased. As a result, communication quality degradation or disconnection may be caused in mobile station terminals during communication.

3. If the coverage area is recovered and the expanded coverage areas are reduced all at once, mobile station terminals during communication at the area boundary are subject to sharp changes of radio wave propagation environments. Thus, likewise, communication quality degradation or disconnection may be caused.

Patent Document 1 discloses executing cell expansion and reduction operations in a stepwise fashion when the halted cell area is recovered from being covered by neighboring cells. In addition, these operations are executed by causing a maintenance terminal to transmit a maintenance command to a base station control apparatus. Thus, the radio base station apparatuses do not autonomously recover the cell areas thereof (see paragraph 0026 in Patent Document 1).

In addition, as a practical problem, the neighboring radio base station apparatus are not necessarily the products of the same vendor. Thus, an unified radio wave transmission start timing may not be used among the radio base station apparatuses. In such case, unless a radio wave transmission timing for each vendor is grasped, the above problem 3 is caused or it is difficult to accurately execute the control operations disclosed in Patent Document 1.

The present invention has been made in view of the above circumstances, and it is an object of the present invention to provide: a mobile communication system that enables radio base station apparatuses to autonomously execute recovery control operations (expansion and reduction) of coverage areas that have been changed for a radio base station apparatus in a service halt state, without depending on an upper apparatus or instructions from a person in charge of maintenance and that enables reduction of possibility of occurrence of communication quality degradation or disconnection in mobile station terminals that are during communication in the related cell areas; a radio base station apparatus; a cell area cooperative control method; and a program.

According to a first aspect of the present invention, there is provided a mobile communication system comprising: a first radio base station apparatus transmitting, after recovering from a service halt state and before starting to execute a stepwise cell area expansion, a notification including an instruction for a cell area reduction corresponding to the cell area expansion to a neighboring second radio base station apparatus; and a second radio base station apparatus reducing a cell area that has been expanded during the service halt state of the first radio base station apparatus, in accordance with the instruction for a cell area reduction included in the notification transmitted from the first radio base station apparatus.

According to a second aspect of the present invention, there is provided a radio base station apparatus, transmitting, after recovering from a service halt state and before starting to execute a stepwise cell area expansion, a notification including instruction for a cell area reduction corresponding to the cell area expansion to a neighboring radio base station apparatus.

According to a third aspect of the present invention, there is provided a radio base station apparatus, reducing a cell area that has been expanded during the service halt state of the radio base station apparatus that has transmitted the notification, in accordance with the instruction for a cell area reduction included in the notification transmitted from the above radio base station apparatus.

According to a fourth aspect of the present invention, there is provided a cell area cooperative control method, comprising: causing a first radio base station apparatus to transmit, after recovering from a service halt state and before starting to execute a stepwise cell area expansion, a notification including an instruction for a cell area reduction corresponding to the cell area expansion to a neighboring second radio base station apparatus; and causing a second radio base station apparatus to reduce a cell area that has been expanded during the service halt state of the first radio base station apparatus, in accordance with an instruction for a cell area reduction included in the notification transmitted from the first radio base station apparatus. The present method is associated with certain machines, namely, with the first and second radio base station apparatuses.

According to a fifth aspect of the present invention, there are provided: a computer program, causing a computer forming a radio base station apparatus to execute the process of transmitting, after recovery from a service halt state and before execution of a stepwise cell area expansion, a notification including an instruction for a cell area reduction corresponding to the cell area expansion to a neighboring radio base station apparatus; and a program, causing a computer forming a radio base station apparatus to execute the process of reducing a cell area, in accordance with the instruction for a cell area reduction included in the notification transmitted from the above radio base station apparatus. This program can be recorded in a computer-readable storage medium. Namely, the present invention can be realized as a computer program product. Also the computer program may be regarded as either a program product (i.e. manufacture) or a process embodying the data storage method (process), expressed in a program language.

The meritorious effects of the present invention are summarized as follows.

According to the present invention, since a stepwise expansion of a cell area of a radio base station apparatus in a service halt state can be synchronized with a stepwise reduction of a cell area of a neighboring radio base station apparatus, the possibility of occurrence of communication quality degradation or disconnection in mobile station terminals during communication in the cell areas can be reduced. This is because the present invention adopts a configuration that enables the recovered radio base station apparatus to transmit an instruction for a cell area reduction corresponding to a cell area expansion of the recovered radio base station apparatus to the neighboring radio base station apparatus.

PREFERRED MODES

Figure 7:
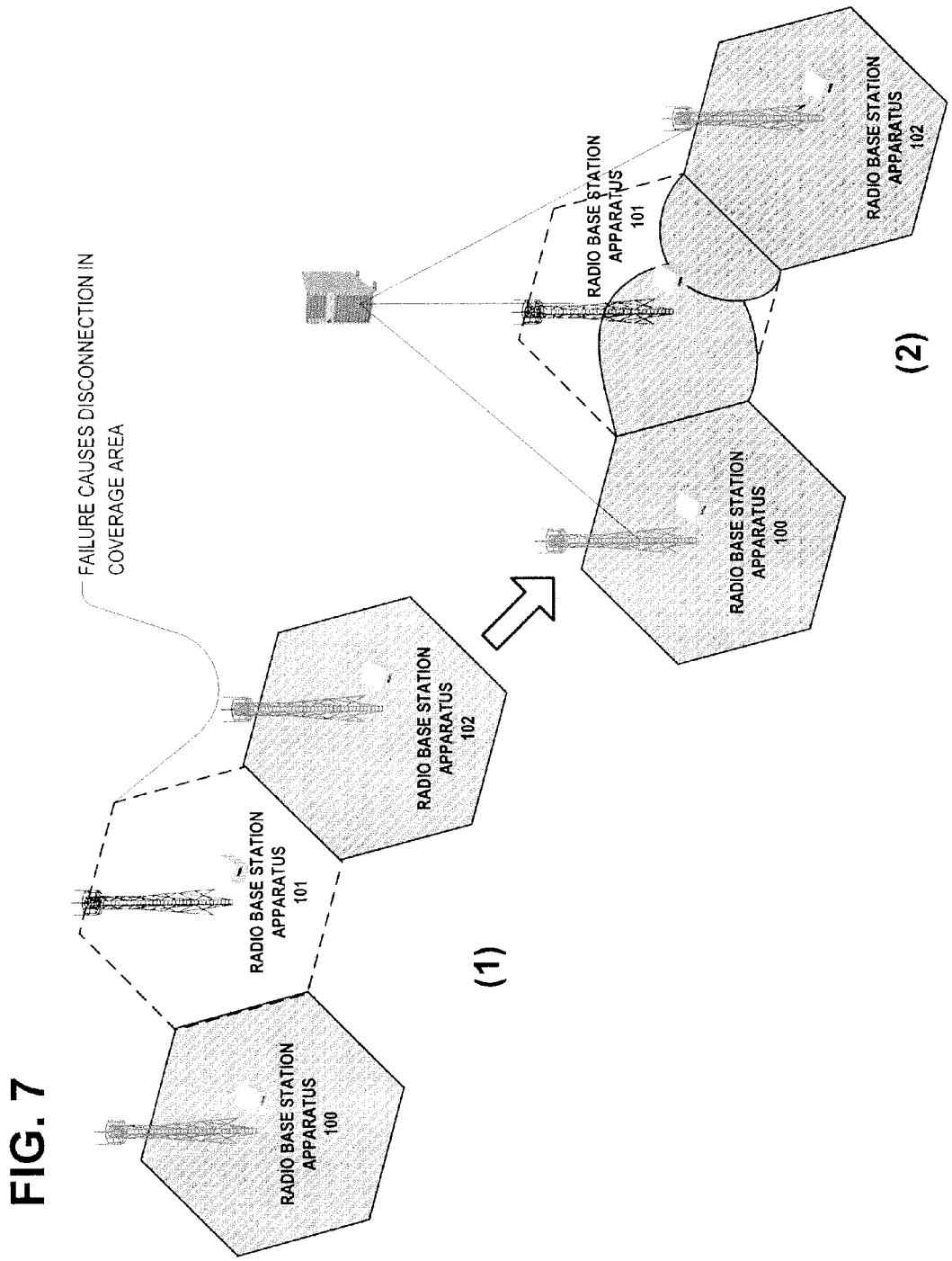
FIG. 7 illustrates an operation of a mobile communication system including a function of enabling neighboring radio base station apparatuses to complement the coverage area of a halted radio base station apparatus.
Figure 8:
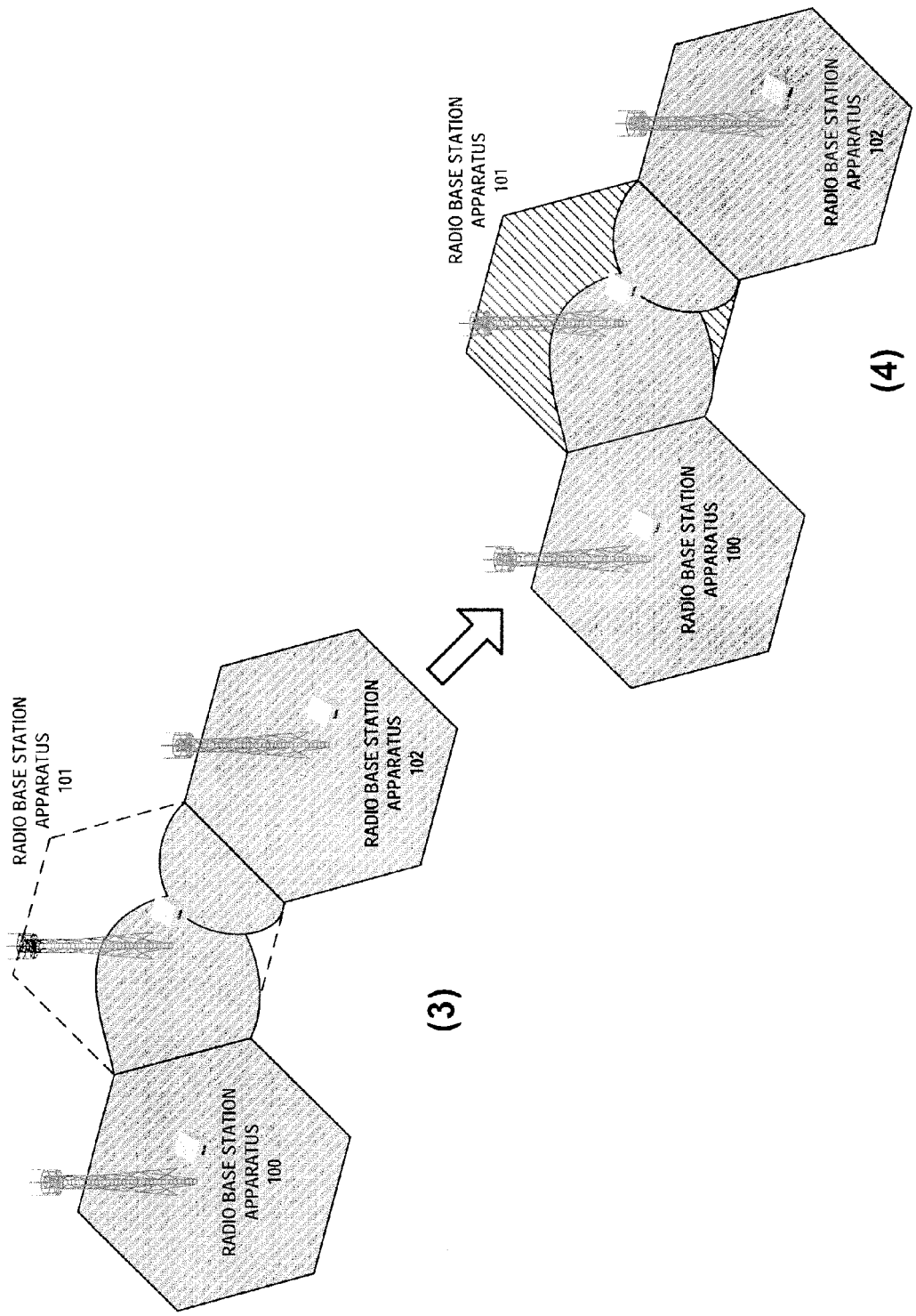
FIG. 8 illustrates a recovery operation from the state in FIG. 7(2).

Next, a outline of an exemplary embodiment of the present invention will be described. The outline will be described, assuming that a failure is caused or maintenance work is executed in a radio base station apparatus 101 and neighboring radio base station apparatuses 100 and 102 are expanding the cell areas thereof and complementing the cell area of the radio base station apparatus 101, as illustrated in FIG. 7(1) and FIG. 7(2).

Figure 1:
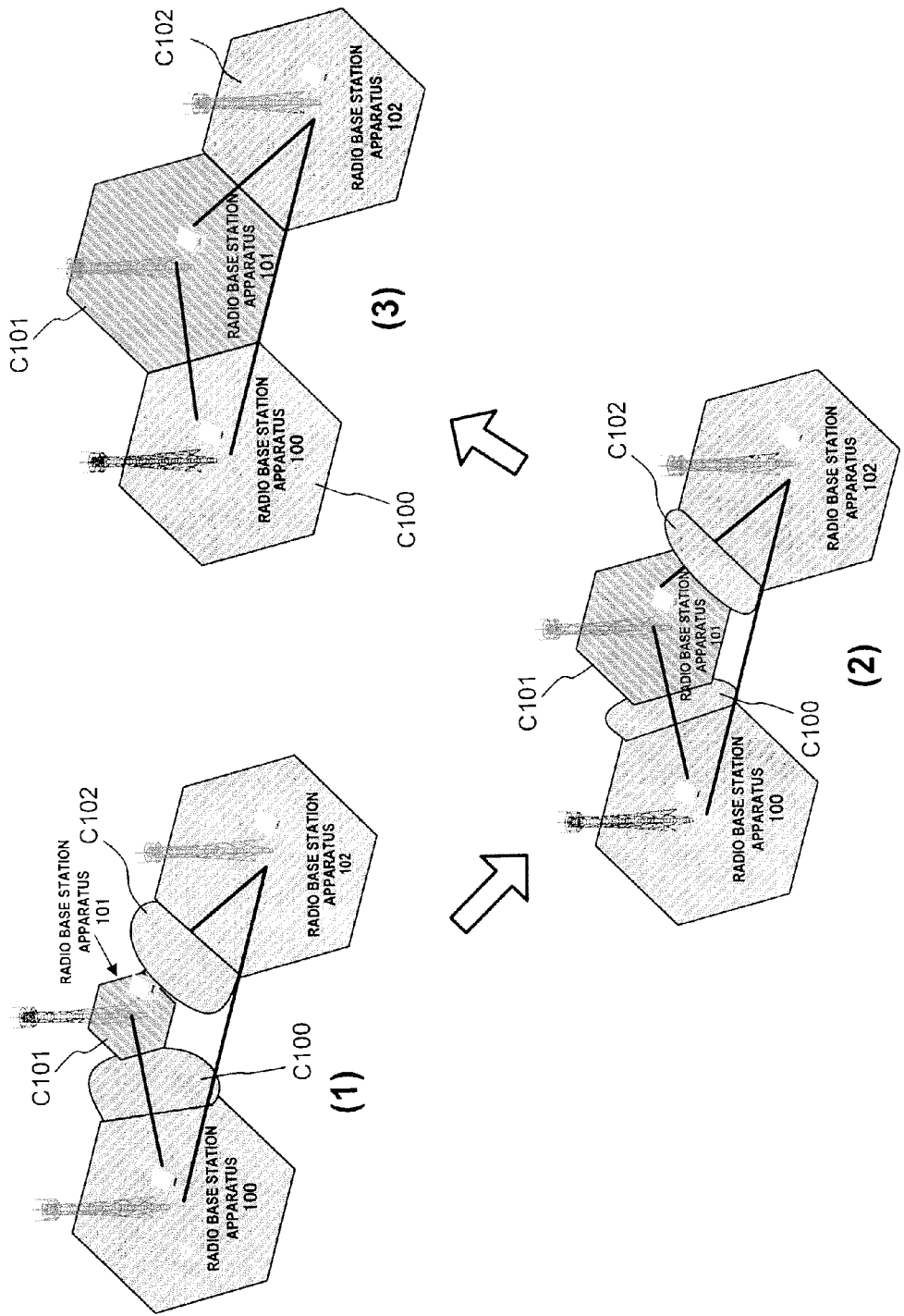
FIG. 1 illustrates a summary of the present invention.

As illustrated in FIGS. 1(1) to (3), if a radio base station apparatus (first radio base station apparatus) 101 according to the present invention recovers from a failure, the radio base station apparatus 101 first transmits a notification including instruction(s) for a cell area reduction corresponding to the cell area expansion to be executed by the radio base station apparatus 101 to neighboring radio base station apparatuses (second radio base station apparatuses) 100 and 102. Next, the radio base station apparatus 101 expands a cell area C101 in a stepwise fashion.

The instruction(s) for a cell area reduction may be transmitted arbitrarily, as long as the neighboring radio base station apparatuses can reduce cell areas C100 and C102 in synchronization with the expansion of the cell area C101. For example, the instructions for a cell area reduction can be transmitted, by using information representing a cell area size or information representing a transmission power value or an antenna tile at each timing. Alternatively, as will be described later, the reduction instruction(s) may be transmitted, by using a step number with which the cell areas are expanded/reduced and time interval(s) (change interval(s)) at which the cell areas are expanded/reduced.

Based on the instruction(s) for a cell area reduction, the neighboring radio base station apparatuses 100 and 102 decrease the antenna tilts and the reference signal transmission power to reduce the expanded cell areas C100 and C102.

It is desirable that the cell area reduction/expansion speed be determined in view of measurement intervals of a downlink radio channel on the mobile station terminal side or assurance of sufficient handover time.

Thus, by synchronizing the recovery speed of a cell area that has been covered by neighboring radio base station apparatuses with the reduction speed of the cell areas of the neighboring radio base station apparatuses, the possibility of occurrence of communication quality degradation or disconnection in mobile station terminals located in the related areas can be reduced.

First Exemplary Embodiment

Next, a first exemplary embodiment of the present invention will be described in detail with reference to the drawings.

Figure 2:
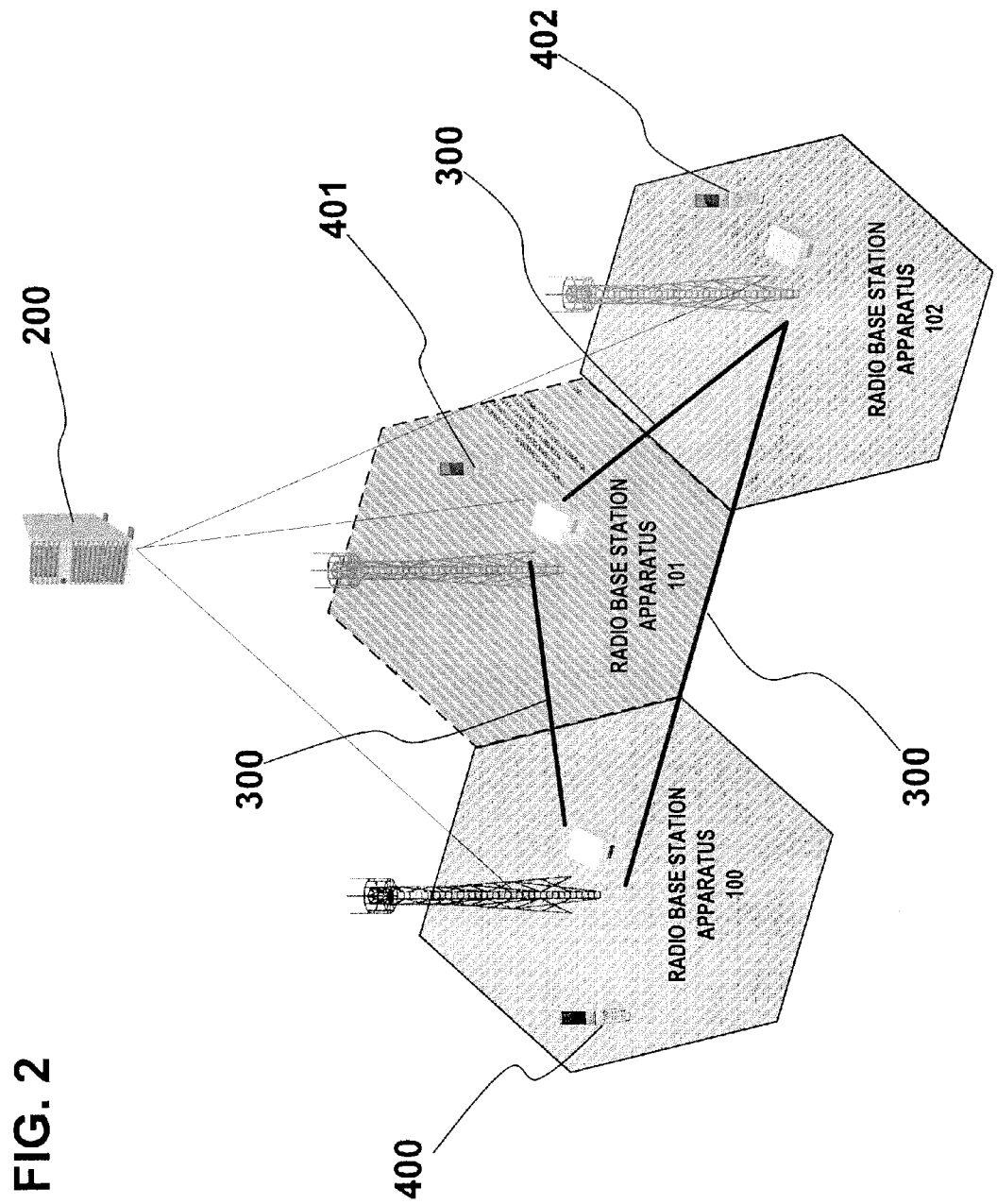
FIG. 2 illustrates a configuration according to a first exemplary embodiment of the present invention.

FIG. 2 illustrates a configuration according to the first exemplary embodiment of the present invention.

FIG. 2 illustrates a configuration in which radio base station apparatuses 100 to 102 and a maintenance and monitoring apparatus 200 as an upper apparatus are connected to each other. While FIG. 2 illustrates three radio base station apparatuses, this is for ease of description. In reality, the number of the radio base station apparatuses is not particularly limited. The radio base station apparatuses are arranged in accordance with the cell layout of the mobile communication system.

The radio base station apparatuses 100 to 102 according to the present exemplary embodiment provide communication services to mobile station terminals 400 to 402 located in respective coverage cell areas, in accordance with specifications such as LTE, LTE-Advance, or E-UTRA (Evolved Universal Terrestrial Radio Access)/E-UTRAN (Evolved Universal Terrestrial Radio Access Network).

Since connected by an inter-base-station interface 300 such as an X2 interface, the radio base station apparatuses 100 to 102 can exchange information with each other.

The maintenance and monitoring apparatus 200 is an upper apparatus that monitors the state of each of the radio base station apparatuses 100 to 102. As one function of the above SON, when one radio base station apparatus becomes unable to provide services, the maintenance and monitoring apparatus 200 may cause neighboring radio base station apparatuses to temporarily complement the coverage area. Detection of failures, selection of neighboring radio base station apparatuses, and expansion of coverage areas that are executed by the maintenance and monitoring apparatus 200 are not particularly limited. Of course, the individual radio base station apparatuses may autonomously detect failures, select neighboring radio base station apparatuses, and expand the respective coverage areas.

Figure 3:
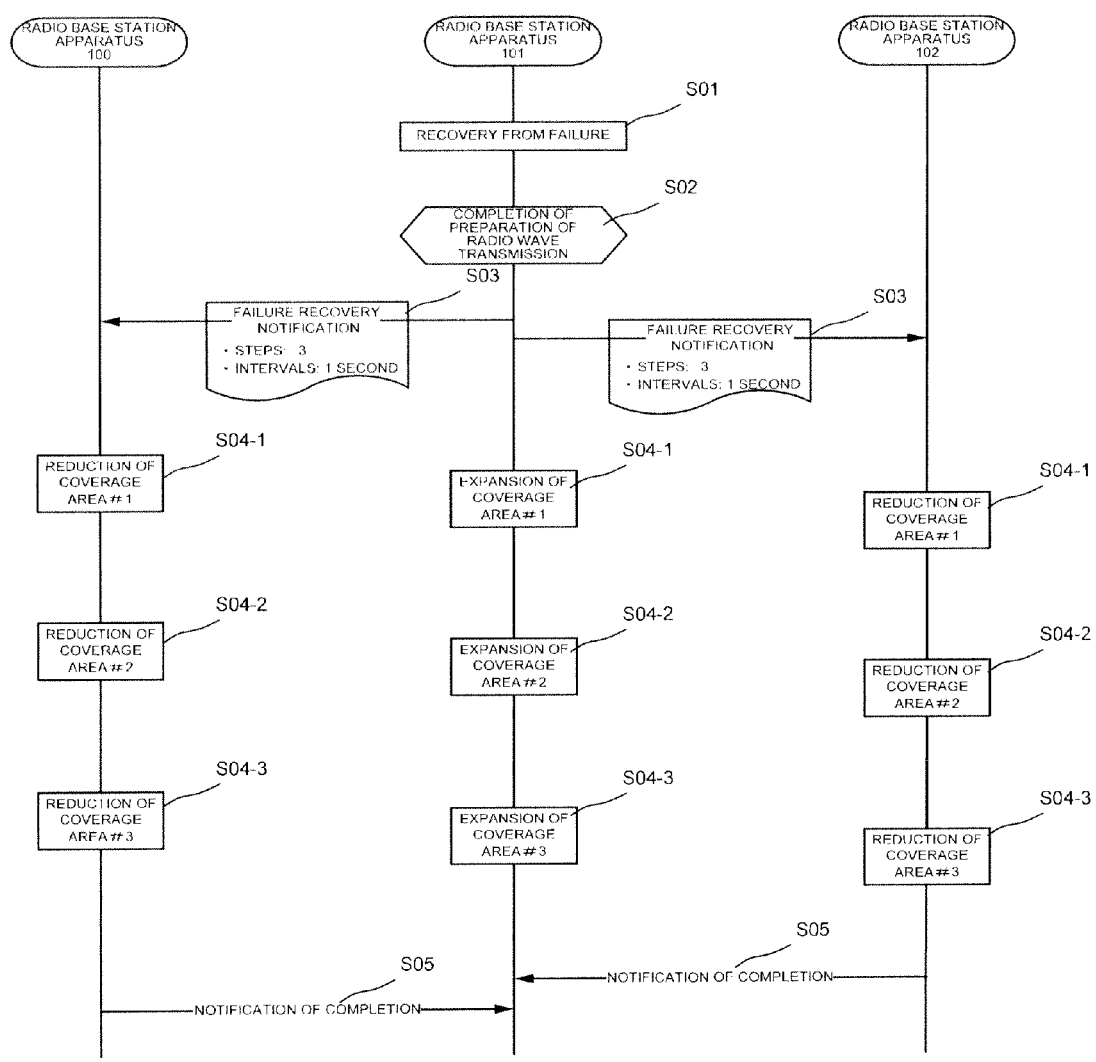
FIG. 3 is a sequence diagram illustrating an operation according to the first exemplary embodiment of the present invention.

Next, an operation of the present exemplary embodiment will be described in detail with reference to the drawings. FIG. 3 is a sequence diagram illustrating an operation according to the first exemplary embodiment of the present invention. In the following description, the radio base station apparatus 101 in FIG. 2 is brought in a service halt state, because of a failure. However, the radio base station apparatuses 100 and 102 can also transmit a failure recovery notification, and the radio base station apparatus 101 can also reduce the coverage area thereof, based on the failure recovery notification transmitted from the radio base station apparatuses 100 and 102.

In the radio base station apparatus 101, after resetting of the apparatus or replacement of a card (panel) is executed, the apparatus is recovered from a failure (step S01). However, since the coverage area of the radio base station apparatus 101 is complemented by neighboring cell(s), the radio base station apparatus 101 does not start transmitting radio waves immediately (step S02; completion of preparation of radio wave transmission).

Next, the radio base station apparatus 101 transmits a failure recovery notification to a group of all the radio base station apparatuses connected via the X2 interface, namely, to the radio base station apparatuses 100 and 102 in this case (step S03). This failure recovery notification includes information about a step number and time (intervals) therefor required when the radio base station apparatus 101 expands the cell area thereof.

The failure recovery notification is transmitted via the X2 interface, and an "ENB CONFIGURATION UPDATE" procedure that is standardized in 3GPP TS36.423 "E-UTRAN (Evolved Universal Terrestrial Radio Access Network; X2 Application Protocol (X2AP)" can be used. By adding two constituent elements "number of step" as a step number description field and "Interval" as a (time) interval description field in an ENB CONFIGURATION UPDATE message, instructions for a cell area reduction can be exchanged among the radio base station apparatuses.

Figure 4:
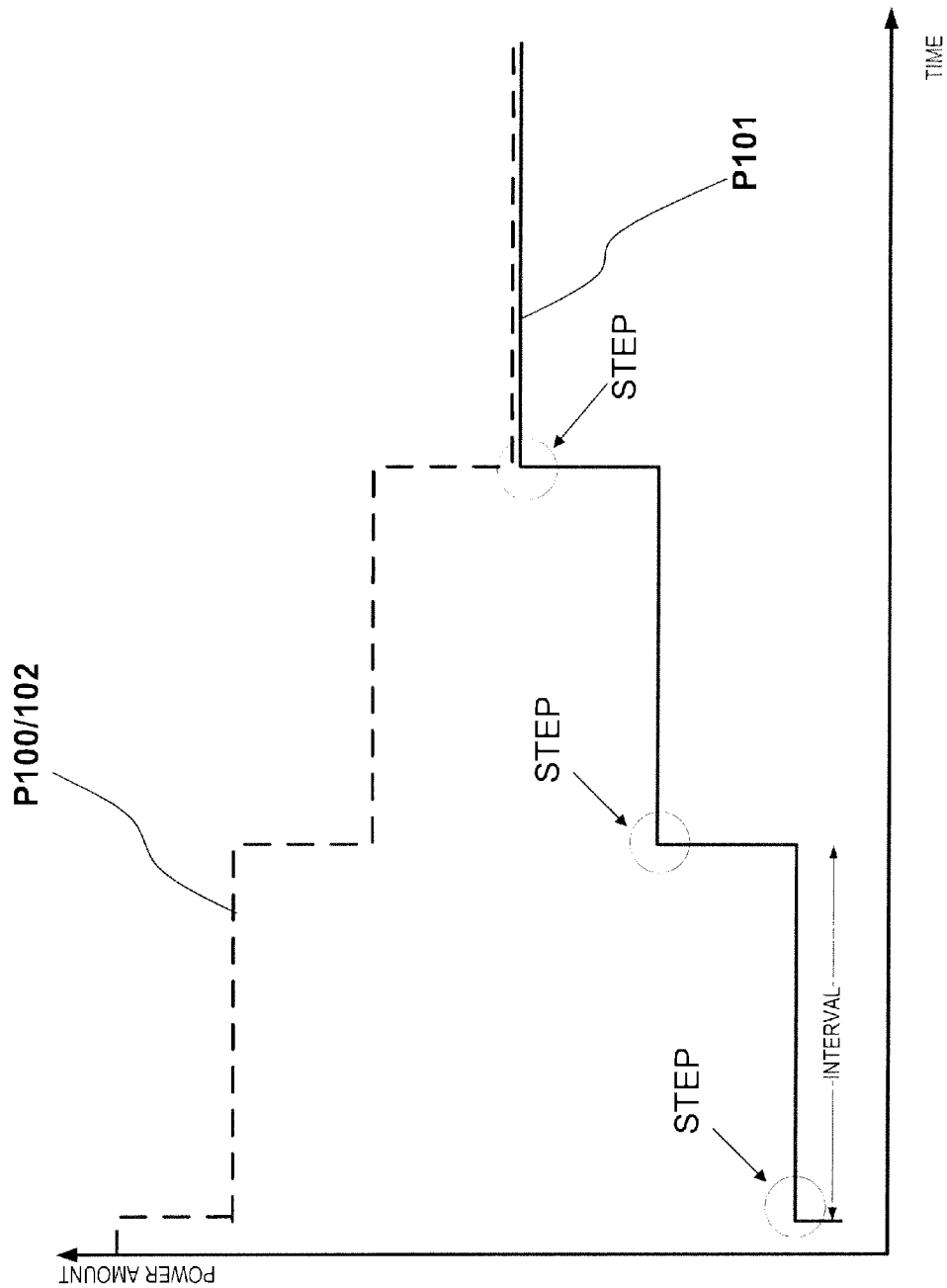
FIG. 4 illustrates changes (expansion/reduction) of cell areas of radio base station apparatuses according to the first exemplary embodiment of the present invention.

FIG. 4 illustrates changes of transmission power values when the step number=3 and the (time) interval=1 second. If the radio base station apparatus 101 increases the transmission power value thereof and expands the cell area thereof in three steps as illustrated by a solid line P101 in FIG. 4, the failure recovery notification includes information representing that the step number=3 and the (time) intervals=1 second.

Referring back to FIG. 3, as the radio base station apparatus 101 expands (recovers) the coverage area thereof in a stepwise fashion, the radio base station apparatuses 100 and 102 that have received the failure recovery notification reduce the power, which has been increased to complement the coverage area of the radio base station apparatus 101, to an original value, in accordance with the step number and the (time) interval included in the failure recovery notification (steps S04-1 to S04-3).

If the transmission power is reduced to the original value, the radio base station apparatuses 100 and 102 transmit a notification of completion of recovery (notification of completion) to the radio base station apparatus 101 (step S05). A dashed line P100/102 in FIG. 4 represents the transmission power value that is changed by the radio base station apparatus 100/102 in accordance with the above failure recovery notification. The transmission power value is reduced in a stepwise fashion, based on the same step number and the same (time) interval as those used by the radio base station apparatus 101.

Thus, for example, as illustrated in FIGS. 1(1) to (3), as the radio base station apparatus 101 expands the coverage area C101, the radio base station apparatuses 100 and 102 reduce the expanded coverage areas C100 and C102. Finally, as illustrated in FIG. 1(3), the radio base station apparatuses 100 to 102 cover the original cell areas, respectively.

Thus, by synchronizing the speed of recovery of the cell area that has been covered by neighboring radio base station apparatuses with the speed of reduction of the coverage areas of the neighboring radio base station apparatuses, the possibility of occurrence of communication quality degradation or disconnection in mobile station terminals located in the related cell areas can be reduced.

In addition, upon occurrence of a failure, which of the neighboring radio base station apparatuses complements the coverage area may vary depending on traffic conditions or capabilities of the neighboring radio base station apparatuses. For example, in accordance with the method in Patent Document 1, a radio base station apparatus having a large traffic amount is excluded from the candidate radio base station apparatuses that may expand the coverage areas thereof. Thus, it is necessary to consider the coverage areas of the individual radio base stations at the time of the recovery.

According to the present invention, after a radio base station apparatus recovers from a service halt state, the radio base station apparatus transmits a failure recovery notification including information about the step number and the (time) interval for expanding the cell area thereof and does not expect to receive a replay message from the neighboring radio base station apparatuses. Thus, the radio base station apparatus that has recovered from a failure does not need to consider which neighboring radio base station apparatuses are complementing the coverage area. The radio base station apparatuses that have received the failure recovery notification autonomously determine whether to reduce the respective expanded coverage areas. Thus, the present invention can be realized with a simple implementation.

Second Exemplary Embodiment

Next, a second exemplary embodiment will be described in detail with reference to the drawings. In the second exemplary embodiment, the failure recovery notification according to the above first exemplary embodiment is changed. Since the present exemplary embodiment has the same configuration as that according to the above first exemplary embodiment, operational differences will be hereinafter described with reference to FIG. 5.

Figure 5:
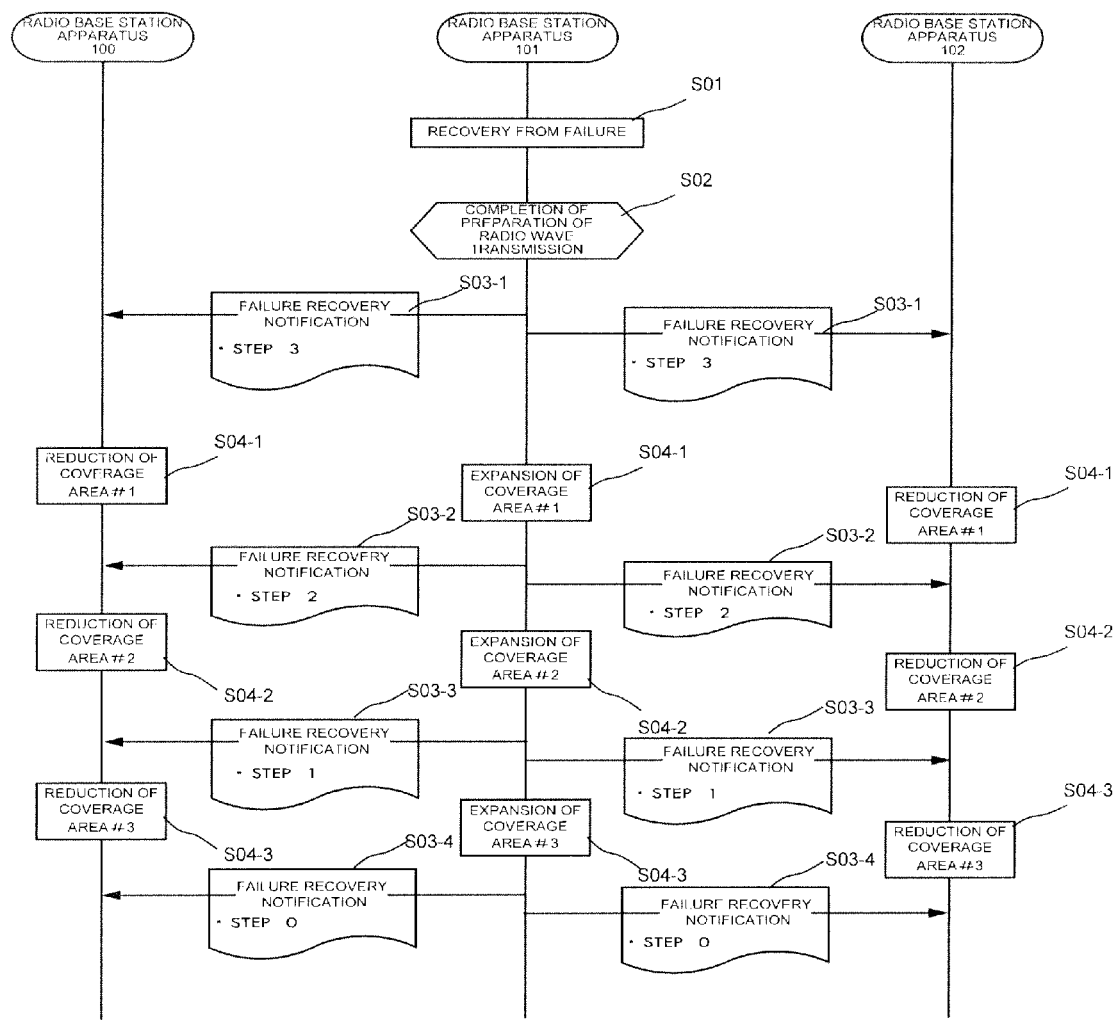
FIG. 5 is a sequence diagram illustrating an operation according to a second exemplary embodiment of the present invention.

As illustrated in step S03-1 in FIG. 5, according to the present exemplary embodiment, if a failure or the like is caused in the radio base station apparatus 101, as in the first exemplary embodiment, the apparatus 101 recovers from the failure (step S01) and completes preparation of radio wave transmission (step S02). Next, the radio base station apparatus 101 transmits a failure recovery notification to a group of all the radio base station apparatuses connected via the X2 interface, namely, to the radio base station apparatuses 100 and 102 in this case (step S03).

While both the step number and the (time) intervals are included in the failure recovery notification according to the above first exemplary embodiment, only the step number is included in the failure recovery notification transmitted in this exemplary embodiment.

Every time the radio base station apparatus 101 increases the transmission power thereof, the radio base station apparatus 101 decrements the step number in the failure recovery notification by 1 and transmits the failure recovery notification to the neighboring radio base station apparatuses via the X2 interface (S03-02 to S03-4). Finally, if the step number in the failure recovery notification reaches a predetermined value (0 or 1), the neighboring radio base station apparatuses can share the knowledge that recovery of the cell area is completed.

Thus, the present invention can be realized, without including the (time) intervals in each failure recovery notification.

Figure 6:
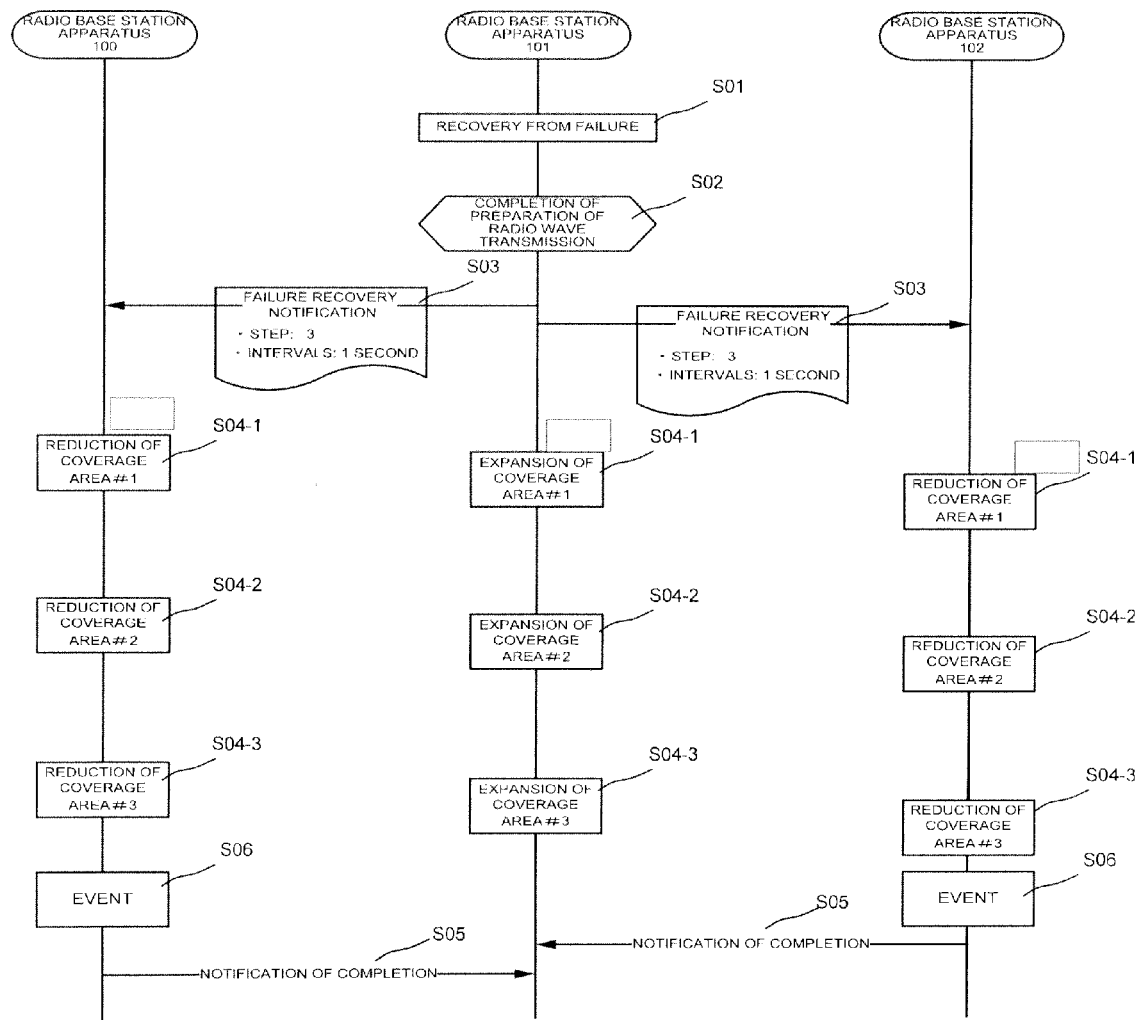
FIG. 6 is a sequence diagram illustrating an operation according to a third exemplary embodiment of the present invention.

While preferred exemplary embodiments of the present invention have thus been described, the present invention is not limited thereto. Further variations, substitutions, or adjustments are possible within the scope of the basic technical concept of the present invention. For example, as illustrated in FIG. 6, after receiving a recovery start notification from the radio base station apparatus 101 and changing the coverage areas, the radio base station apparatuses 100 and 102 may receive a notification of completion of movement from mobile station terminals (step S06 in FIG. 6; event) and transmit a notification of completion of recovery to the radio base station apparatus 101.

In addition, in the above exemplary embodiments, the X2 interface is used as an interface among the above radio base station apparatuses. However, for example, an S1 interface, an Iur interface, or an Iu interface may be used.

By adding two constituent elements "number of step" and "Interval" in an "ENB CONFIGURATION UPDATE" procedure in the case of the S1 interface, in an "INFORMATION EXCHANGE INITIATION" procedure in the case of the Iur interface, and in an "UPLINK INFORMATION EXCHANGE" procedure in the case of the Iu interface, the step number and the (time) intervals can be transmitted.

In addition, in the above first and second exemplary embodiments, the step number is used. However, other numerical values may be used, as long as each radio base station can determine to which degree the cell area needs to be reduced at the next timing. In addition, in the above second exemplary embodiment, the step number is decremented. However, another method may be used without problem, as long as these numerical values are increased/decreased at a certain step pace and reduction of cell areas is stopped when the numerical values reach certain values. The entire disclosures of the above Patent Document and the like are incorporated herein by reference thereto. Modifications and adjustments of the exemplary embodiments and examples are possible within the scope of the overall disclosure (including the claims) of the present invention and based on the basic technical concept of the present invention. Various combinations and selections of various disclosed elements are possible within the scope of the claims of the present invention. That is, the present invention of course includes various variations and modifications that could be made by those skilled in the art according to the overall disclosure including the claims and the technical concept.

In the following, preferred modes are summarized.

Mode 1

A mobile communication system, comprising:
a first radio base station apparatus transmitting, after recovering from a service halt state and before starting to execute a stepwise cell area expansion, a notification including an instruction for a cell area reduction corresponding to the cell area expansion to a neighboring second radio base station apparatus; and
a second radio base station apparatus reducing a cell area that has been expanded during the service halt state of the first radio base station apparatus, in accordance with the instruction for a cell area reduction included in the notification transmitted from the first radio base station apparatus.

Mode 2

The mobile communication system according to mode 1;
wherein the instruction for a cell area reduction includes a step number required to regain an original cell area; and
wherein the second radio base station apparatus executes a stepwise cell area reduction, in accordance with the step number.

Mode 3

The mobile communication system according to mode 2;
wherein the instruction for a cell area reduction further includes a cell area change interval; and
wherein the second radio base station apparatus executes a stepwise cell area reduction at the change intervals.

Mode 4

The mobile communication system according to mode 1 or 2;
wherein the first radio base station apparatus transmits, before executing each stepwise cell area expansion, a notification including an instruction for a cell area reduction corresponding to the cell area expansion; and
wherein the second radio base station apparatus executes a stepwise cell area reduction, in accordance with the notification.

Mode 5

The mobile communication system according to mode 1;
wherein the instruction for a cell area reduction includes information representing a cell area size at each timing after recovery from a service halt state; and
wherein the second radio base station apparatus executes a stepwise cell area reduction, in accordance with the instruction for a cell area reduction.

Mode 6

A radio base station apparatus, transmitting, after recovering from a service halt state and before starting to execute a stepwise cell area expansion, a notification including an instruction for a cell area reduction corresponding to the cell area expansion to a neighboring radio base station apparatus.

Mode 7

A radio base station apparatus, reducing a cell area that has been expanded during the service halt state of the radio base station apparatus that has transmitted the notification, in accordance with the instruction for a cell area reduction included in the notification transmitted from the radio base station apparatus according to mode 6.

Mode 8

A cell area cooperative control method, comprising:

causing a first radio base station apparatus to transmit, after recovering from a service halt state and before starting to execute a stepwise cell area expansion, a notification including an instruction for a cell area reduction corresponding to the cell area expansion to a neighboring second radio base station apparatus; and causing a second radio base station apparatus to reduce a cell area that has been expanded during the service halt state of the first radio base station apparatus, in accordance with the instruction for a cell area reduction included in the notification transmitted from the first radio base station apparatus.

Mode 9

A program, causing a computer forming a radio base station apparatus to execute a process of transmitting, after recovery from a service halt state and before execution of a stepwise cell area expansion, a notification including an instruction for a cell area reduction corresponding to the cell area expansion to a neighboring second radio base station apparatus.

Mode 10

A computer program, causing a computer forming a radio base station apparatus to execute the process of reducing a cell area, in accordance with the instruction for a cell area reduction included in the notification transmitted from the radio base station apparatus according to mode 6.

EXPLANATION OF SYMBOLS 100 to 102 radio base station apparatus
200 maintenance and monitoring apparatus
300 inter-base-station interface
400 to 402 mobile station terminal
C100 to C102 cell area (coverage area)

What is claimed is:

1. A mobile communication system, comprising:
a first radio base station apparatus transmitting, after recovering from a service halt state and before starting to execute a stepwise cell area expansion, a notification including an instruction for a cell area reduction corresponding to the cell area expansion to a neighboring second radio base station apparatus; and
a second radio base station apparatus reducing a cell area that has been expanded during the service halt state of the first radio base station apparatus, in accordance with the instruction for a cell area reduction included in the notification transmitted from the first radio base station apparatus.

2. The mobile communication system according to claim 1, wherein the instruction for a cell area reduction includes a step number required to regain an original cell area; and
wherein the second radio base station apparatus executes a stepwise cell area reduction, in accordance with the step number.

3. The mobile communication system according to claim 2, wherein the instruction for a cell area reduction further includes a cell area change interval; and
wherein the second radio base station apparatus executes a stepwise cell area reduction at the change interval.

4. The mobile communication system according to claim 1, wherein the first radio base station apparatus transmits, before executing each stepwise cell area expansion, a notification including an instruction for a cell area reduction corresponding to the cell area expansion; and
wherein the second radio base station apparatus executes a stepwise cell area reduction, in accordance with the notification.

5. The mobile communication system according to claim 1, wherein the instruction for a cell area reduction includes information representing a cell area size at each timing after recovery from a service halt state; and
wherein the second radio base station apparatus executes a stepwise cell area reduction, in accordance with the instruction for a cell area reduction.

6. The mobile communication system according to claim 2, wherein the first radio base station apparatus transmits, before executing each stepwise cell area expansion, a notification including an instruction for a cell area reduction corresponding to the cell area expansion; and
wherein the second radio base station apparatus executes a stepwise cell area reduction, in accordance with the notification.

7. A radio base station apparatus comprising a processor which transmits, after recovering from a service halt state and before starting to execute a stepwise cell area expansion, a notification including an instruction for a cell area reduction corresponding to the cell area expansion to a neighboring radio base station apparatus.

8. A radio base station apparatus, reducing a cell area that has been expanded during the service halt state of the radio base station apparatus that has transmitted the notification, in accordance with the instruction for a cell area reduction included in the notification transmitted from the radio base station apparatus according to claim 7.

9. A computer program embodied in a non-transitory recording medium, causing a computer forming a radio base station apparatus to execute the process of reducing a cell area, in accordance with the instruction for a cell area reduction included in the notification transmitted from the radio base station apparatus according to claim 6.

10. A cell area cooperative control method, comprising:
causing a first radio base station apparatus to transmit, after recovering from a service halt state and before starting to execute a stepwise cell area expansion, a notification including an instruction for a cell area reduction corresponding to the cell area expansion to a neighboring second radio base station apparatus; and
causing a second radio base station apparatus to reduce a cell area that has been expanded during the service halt state of the first radio base station apparatus, in accordance with the instruction for a cell area reduction included in the notification transmitted from the first radio base station apparatus.

11. A computer program embodied in a non-transitory recording medium, causing a computer forming a radio base station apparatus to execute a process of transmitting, after recovery from a service halt state and before execution of a stepwise cell area expansion, a notification including an instruction for a cell area reduction corresponding to the cell area expansion to a neighboring second radio base station apparatus.

* * * * *